United States Patent [19]

Albertson

[11] Patent Number: 4,955,350

[45] Date of Patent: Sep. 11, 1990

[54] FUEL INJECTION

[75] Inventor: William C. Albertson, Sterling Heights, Mich.

[73] Assignee: General Motors Corporation, Detroit, Mich.

[21] Appl. No.: 369,503

[22] Filed: Jun. 21, 1989

[51] Int. Cl.[5] ...................... F02M 67/02; G05D 16/20

[52] U.S. Cl. .................................... 123/533; 123/531; 137/87

[58] Field of Search .................. 123/531, 533; 137/87, 137/115, 496, 599

[56] References Cited

U.S. PATENT DOCUMENTS

| | | | |
|---|---|---|---|
| 3,987,771 | 10/1976 | Oglesby | 123/531 |
| 4,708,117 | 11/1987 | Mesenich et al. | 123/533 |
| 4,754,735 | 7/1988 | Simons | 123/531 |
| 4,770,094 | 9/1988 | Schiel | 137/87 |
| 4,803,968 | 2/1989 | Czwienczek et al. | 123/531 |
| 4,841,942 | 6/1989 | McKay | 123/533 |

*Primary Examiner*—Tony M. Argenbright
*Assistant Examiner*—Robert Mates
*Attorney, Agent, or Firm*—C. K. Veenstra

[57] ABSTRACT

A pressure regulator has a spool valve positioned by a linear motor to control flow through a spill passage from a fuel inlet to a fuel outlet and thereby control the fuel pressure in the inlet as a function of the current in the linear motor, a piston subjected to the pressure in the fuel inlet and defining a variable orifice adapted to create a reference pressure at a desired differential from the pressure in the fuel inlet, a diaphragm subjected to the reference pressure and the pressure in the air inlet, and a valve positioned by the diaphragm to control flow from the air inlet to the air outlet whereby the pressure in the air inlet is maintained at a desired differential below the pressure in the fuel inlet.

1 Claim, 1 Drawing Sheet

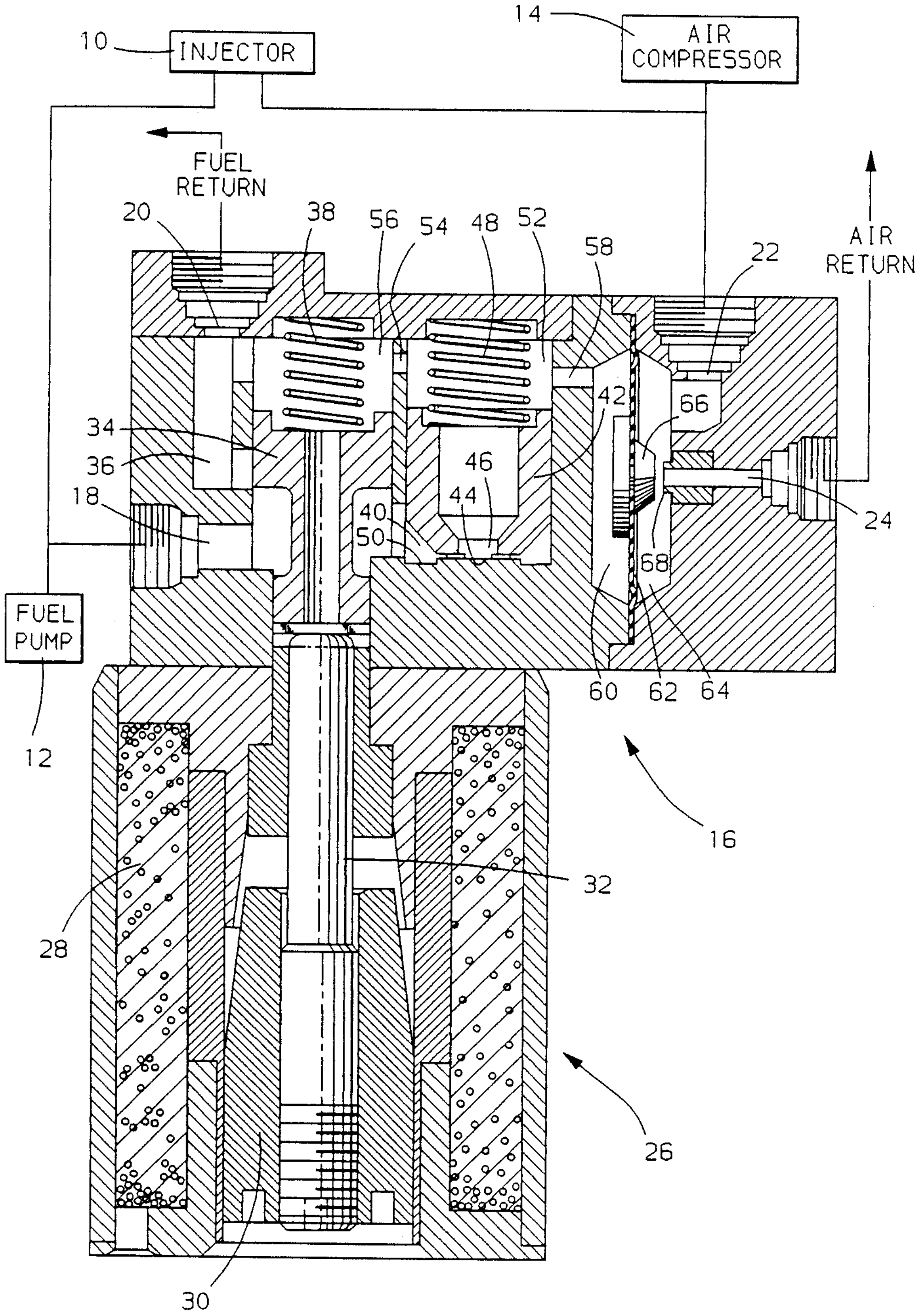
10
INJECTOR
14
AIR
COMPRESSOR
FUEL
RETURN
AIR
RETURN
20
38
56
54
48
52
58
22
34
36
18
42
66
46
44
40
50
24
68
FUEL
PUMP
60
62
64
12
16
32
28
26
30

FUEL INJECTION

TECHNICAL FIELD

This invention provides a pressure regulator suitable for controlling the pressures of fuel and air in a system for injecting a charge of fuel and air directly into an engine combustion chamber.

SUMMARY OF THE DRAWING

The sole FIGURE of the drawing schematically illustrates an injection system employing the pressure regulator provided by this invention.

DETAILED DESCRIPTION

Referring to the drawing, an injector 10 receives fuel from a fuel pump 12 and air from an air compressor 14 and directs a fuel-air charge directly into an engine combustion chamber.

A pressure regulator 16 has an inlet 18 receiving fuel from fuel pump 12 and an outlet 20 for discharging excess fuel through a fuel return line. Pressure regulator 16 also has an inlet 22 receiving air from air compressor 14 and an outlet 24 for discharging excess air through an air return line. By discharging excess fuel and air, pressure regulator 16 maintains the fuel and air supplied to injector 10 at the desired pressures.

Pressure regulator 16 includes a linear motor 26 having a coil 28 and an armature 30. Armature 30 carries a valve stem 32 that positions a spool valve 34 at the entrance to a spill passage 36. The position of spool valve 34 with respect to spill passage 36 controls fuel flow through spill passage 36 from inlet 18 to outlet 20. A spring 38 biases spool valve 34 to obstruct fuel flow through spill passage 36.

Spool valve 34 is moved upwardly as viewed in the drawing by the fuel pressure in inlet 18 until the force of spring 38 balances the inlet fuel pressure. The inlet fuel pressure accordingly is a function of spring force. When the coil 28 of linear motor 26 is energized, armature 30, valve stem 32 and spool valve 34 are displaced upwardly as viewed in the drawing, thereby increasing flow through spill passage 36 and reducing the inlet fuel pressure. Linear motor accordingly has the effect of reducing the force of spring 38 and correspondingly reducing the inlet fuel pressure as a function of the current through coil 28.

To regulate the air pressure to injector 10 at a fixed differential below the inlet fuel pressure, a sample of the inlet fuel pressure is reduced to the desired air pressure and communicated to an air pressure control. The space around the reduced shank of spool valve 34 communicates the fuel pressure in inlet 18 to a pressure chamber 40 closed by a piston 42. The end 44 of piston 42 has an orifice 46 and defines a valve surface surrounding orifice 46. A spring 48 biases piston 42 toward the wall 50 of pressure chamber 40. As fuel pressure increases in inlet 18, piston 42 is displaced against the bias of spring 48, thereby increasing the variable orifice defined between piston valve surface 44 and the end 50 of pressure chamber. The chamber 52 behind piston 42 is connected by an orifice 54 to the chamber 56 behind spool valve 34 and thus to outlet 20.

Fixed orifice 46 and the variable orifice between piston surface 44 and chamber wall 50, together with orifice 54, reduce the pressure in chamber 52 to the desired differential below the inlet fuel pressure. An aperture 58 communicates the pressure in chamber 52 to a reference pressure chamber 60 closed by a diaphragm 62.

The chamber 64 on the opposite side of diaphragm 62 is subjected to the pressure in air inlet 22. Diaphragm 62 carries a valve 66 that controls the discharge of excess air through outlet 24. When the desired air pressure in reference chamber 52 is less than the inlet air pressure in chamber 64, diaphragm 62 is displaced leftwardly as viewed in the drawing; valve 66 is then displaced from its seat 68 surrounding outlet 24 to increase air flow through outlet 24 and thereby decrease the inlet air pressure. When the desired air pressure in reference chamber 52 is greater than the inlet air pressure in chamber 64, diaphragm 62 is displaced rightwardly as viewed in the drawing; valve 66 is then displaced toward seat 68 to decrease air flow through outlet 24 and thereby increase the inlet air pressure.

I claim:

1. A pressure regulator comprising a body having a fuel inlet, a fuel outlet, an air inlet, an air outlet, a spill passage connecting the fuel inlet to the fuel outlet, a spool valve controlling flow through the spill passage, a linear motor having a coil and an armature, a stem connecting the armature to the valve to position the valve to control flow through the spill passage and thereby to control the fuel pressure in the inlet as a function of the current in the coil, a piston subjected to the pressure in the fuel inlet, the piston defining a variable orifice adapted to create a reference pressure at a desired differential from the pressure in the fuel inlet, a diaphragm subjected to the reference pressure and the pressure in the air inlet, and a valve positioned by the diaphragm to control flow from the air inlet to the air outlet whereby the pressure in the air inlet is maintained at a desired differential below the pressure in the fuel inlet.

* * * * *